US012689850B2

(12) United States Patent
Kalinichenko

(10) Patent No.: US 12,689,850 B2
(45) Date of Patent: Jul. 21, 2026

(54) AUDIO SYSTEM ARRANGED IN A LISTENING ENVIRONMENT

(71) Applicant: Harman Becker Automotive Systems GmbH, Karlsbad (DE)

(72) Inventor: Victor Kalinichenko, Putzbrunn (RU)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 135 days.

(21) Appl. No.: 18/753,885

(22) Filed: Jun. 25, 2024

(65) Prior Publication Data

US 2024/0430600 A1 Dec. 26, 2024

(30) Foreign Application Priority Data

Jun. 26, 2023 (EP) .................................... 23181346

(51) Int. Cl.
*H04R 1/02* (2006.01)
*G10K 11/178* (2006.01)

(52) U.S. Cl.
CPC ....... *H04R 1/028* (2013.01); *G10K 11/17823* (2018.01); *G10K 11/17873* (2018.01); *H04R 1/025* (2013.01); *G10K 2210/1282* (2013.01); *G10K 2210/3027* (2013.01); *G10K 2210/3046* (2013.01); *H04R 2499/13* (2013.01); *H04R 2499/15* (2013.01)

(58) Field of Classification Search
CPC .... H04R 1/028; H04R 1/025; H04R 2499/13; H04R 2499/15; H04R 7/045; H04R 1/345; H04R 1/403; H04R 1/02; G10K 11/17823; G10K 11/17873; G10K 2210/1282; G10K 2210/3027; G10K 2210/3046; G10K 2210/129; G10K 2210/3212; G10K 11/24; G10K 2210/128; G10K 11/178
See application file for complete search history.

(56) References Cited

U.S. PATENT DOCUMENTS

| | | | | |
|---|---|---|---|---|
| 2015/0341714 | A1 | 11/2015 | Ahn et al. | |
| 2018/0317012 | A1 | 11/2018 | Lee et al. | |
| 2021/0266661 | A1* | 8/2021 | Winton | H04S 7/307 |
| 2022/0044632 | A1* | 2/2022 | Kajimoto | H04R 23/00 |
| 2022/0129234 | A1* | 4/2022 | Nam | B60K 35/26 |

OTHER PUBLICATIONS

European Patent Office, Extended European Search Report Issued in Application No. 23181346.0, Dec. 7, 2023, Germany, 9 pages.

* cited by examiner

*Primary Examiner* — Yosef K Laekemariam
(74) *Attorney, Agent, or Firm* — McCoy Russell LLP

(57) ABSTRACT

An audio system arranged in a listening environment in a vehicle comprises at least one multimedia unit configured to output an audio signal, and at least one display loudspeaker, wherein each of the at least one display loudspeaker is coupled to the at least one multimedia unit and receives the audio signal from the at least one multimedia unit, and each of the at least one display loudspeaker comprises an OLED panel and at least one exciter coupled to the OLED panel and configured to vibrate the OLED panel to reproduce the audio signal.

9 Claims, 3 Drawing Sheets

AUDIO SYSTEM ARRANGED IN A LISTENING ENVIRONMENT

CROSS REFERENCE TO RELATED APPLICATIONS

The present application claims priority to European Patent Application No. 23181346.0, entitled "APPLICATION OF LED-DISPLAY BASED LOUDSPEAKERS FOR VARIOUS AUTOMOTIVE AUDIO APPLICATIONS", and filed on Jun. 26, 2023. The entire contents of the above-listed application is hereby incorporated by reference for all purposes.

TECHNICAL FIELD

The disclosure relates to an audio system arranged in a listening environment, in particular in a listening environment in a vehicle.

BACKGROUND

Integration of speakers in a vehicle may be challenging. When integrating an audio system comprising one or more speakers into a vehicle, many different aspects and constraints have to be considered. An important aspect to be considered is that each passenger of the vehicle should have a satisfying listening experience, which is often achieved by increasing the number of speakers combined with sophisticated digital signal processing algorithms, requiring significant processing power. Increasing the number of speakers in a listening environment in a vehicle is generally cost intensive and challenging, due to limited space that is available in the vehicle. Each additional electrodynamic speaker, as are generally used in vehicles (e.g., loudspeakers arranged in loudspeaker box or enclosure), requires additional mounting space. Ideally, an audio system should further provide the possibility of creating individual listening zones, one for each passenger of the vehicle.

There is a need for an audio system arranged in a listening environment in a vehicle that provides a satisfying listening experience for all occupants that are present in the listening environment while requiring only little assembly space.

SUMMARY

An audio system arranged in a listening environment in a vehicle is disclosed herein. The audio system includes at least one multimedia unit configured to output an audio signal, and at least one display loudspeaker, wherein each of the at least one display loudspeaker is coupled to the at least one multimedia unit and receives the audio signal from the at least one multimedia unit, and each of the at least one display loudspeaker includes an OLED panel and at least one exciter coupled to the OLED panel and configured to vibrate the OLED panel to reproduce the audio signal.

Other systems, features and advantages of the disclosure will be or will become apparent to one with skill in the art upon examination of the following detailed description and figures. It is intended that all such additional systems, methods, features and advantages included within this description, be within the scope of the invention and be protected by the following claims.

BRIEF DESCRIPTION OF THE DRAWINGS

The arrangements may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
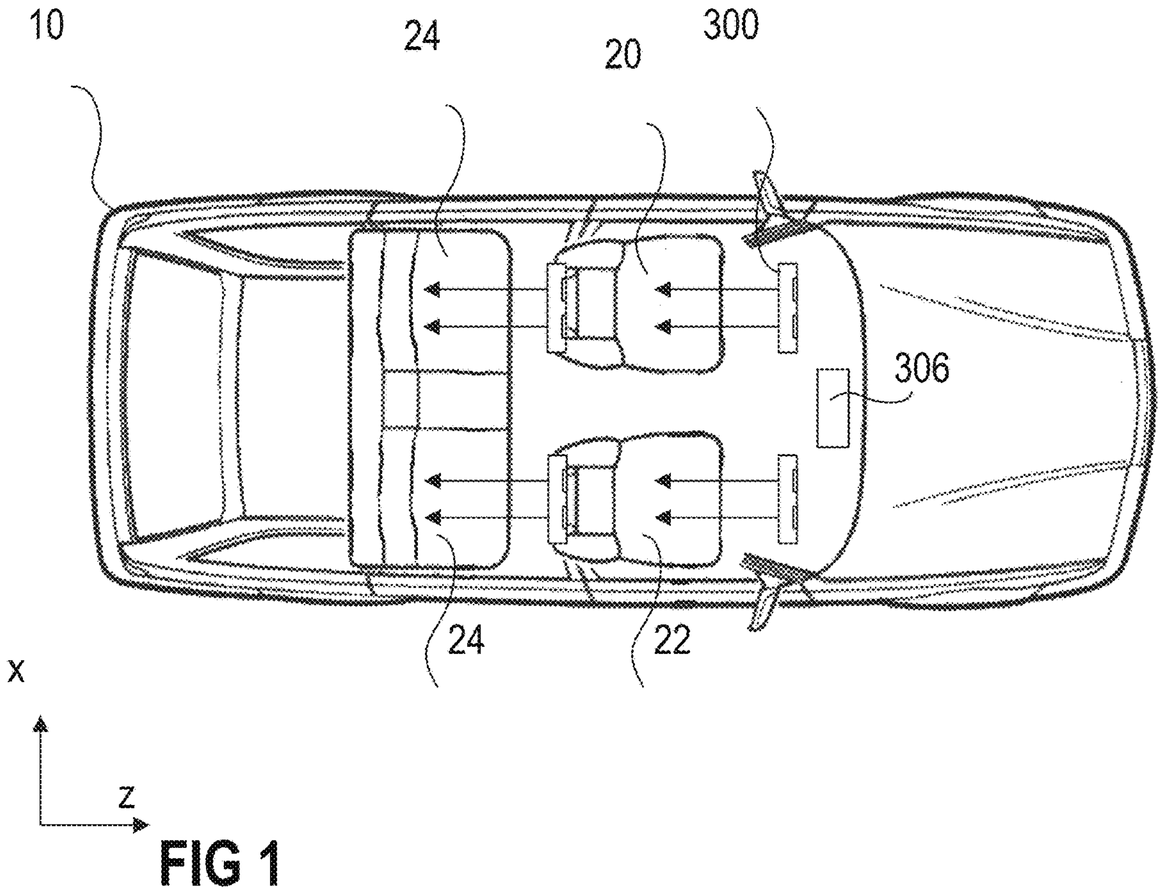
FIG. 1 schematically illustrates a top view of an audio system arranged in a listening environment in a vehicle according to embodiments of the disclosure.

FIG. 1 schematically illustrates a top view of a vehicle 10. The vehicle 10 comprises a driver's seat 20, a front passenger seat 22, and two rear passenger seats 24. Vehicles generally may comprise less seats (e.g., only a driver's seat 20 and a front passenger seat 22), or even more than four seats (e.g., more than two rear passenger seats 24). When audio is played by means of an audio system arranged in the listening environment in the vehicle 10, all passengers should experience a similarly satisfying listening experience. This, however, may be challenging. Assembly space in a vehicle 10 is generally limited, therefore, a satisfying listening experience for all passengers should be achieved with as few loudspeakers as possible. If possible, an audio system should further provide the possibility of creating individual listening zones, one for each passenger of the vehicle 10.

Figure 2:
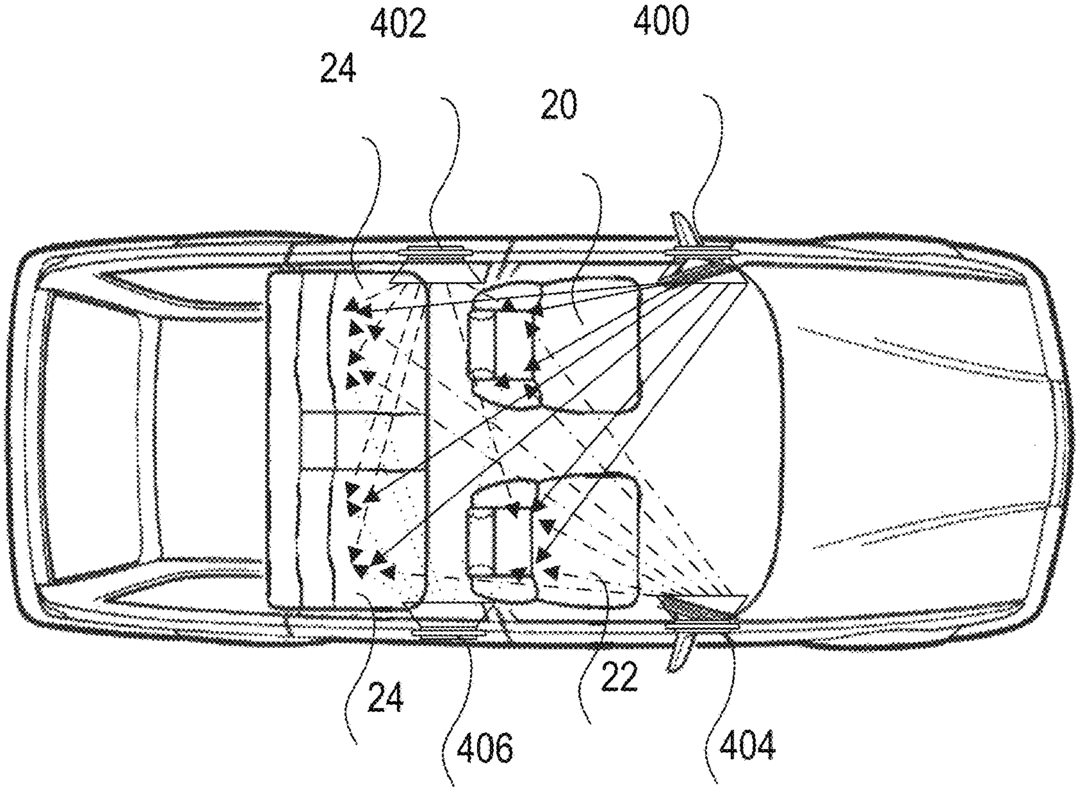
FIG. 2 schematically illustrates the influence of sound emitted by classical electrodynamic speakers with wide directivity on different passengers of a vehicle including sound reflections from in-cabin surfaces.

FIG. 2 schematically illustrates the influence of conventional electrodynamic speakers with wide directivity on different passengers of a vehicle 10. As can be seen, each passenger of the vehicle 10 perceives direct sound from each of a plurality of loudspeakers 400, 402, 404, 406 mounted at different positions, e.g., in the side panels, of the vehicle 10. Sound that is output by a first speaker 400 is indicated in solid lines, sound that is output by a second speaker 402 is indicated in dashed lines, sound that is output by a third speaker 404 is indicated in dot-dashed lines, and sound that is output by a fourth speaker 406 is indicated in dotted lines. Each of the different loudspeakers 400, 402, 404, 406 in a vehicle generally outputs the same audio content (preliminary processed using audio processing techniques, e.g., digital audio signal processing algorithms), which is perceived similarly by each passenger seated on one of the seats 20, 22, 24. Conventional audio systems in a vehicle 10 generally comprise a plurality of loudspeakers that are mounted, e.g., in a dashboard or side panel of the vehicle 10. Each of the plurality of speakers requires a significant amount of mounting space as well as its own cabling connecting it to (at least one) multimedia unit of the vehicle.

Figure 3:
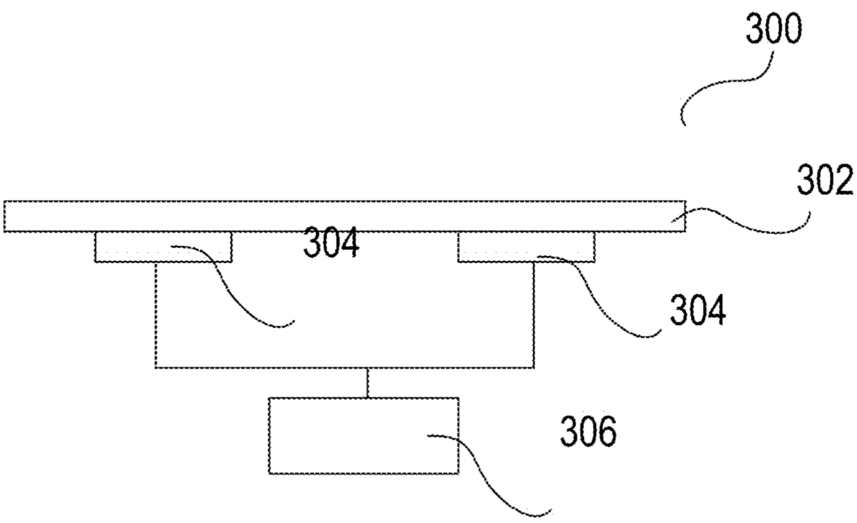
FIG. 3 schematically illustrates an audio system according to embodiments of the disclosure.

Again referring to FIG. 1 and with further reference to FIG. 3, an audio system in a listening environment in a vehicle 10 according to embodiments of the disclosure comprises at least one multimedia unit 306 configured to output an audio signal, and at least one display loudspeaker

300. In FIG. 3 only one multimedia unit 306 is exemplarily illustrated. Each of the at least one display loudspeaker 300 is coupled to the at least one multimedia unit 306 and receives the audio signal from the at least one multimedia unit 306. As is illustrated in FIG. 3, each of the at least one display loudspeaker 300 comprises an OLED panel 302 and at least one exciter 304 coupled to the OLED panel 302 and configured to vibrate the OLED panel 302 to reproduce the audio signal. The OLED panel 302 may be any conventional OLED (organic light emitting diode) panel or display which are generally known and will not be described in further detail herein. OLED panels are generally very thin as compared to, e.g., LCD displays, and require only little mounting space. The OLED panel 302 may be vibrated by means of one or more exciters 304. The one or more exciters 304 may be attached to the back of the OLED panel 302 and are therefore not visible for passengers of the vehicle 10. As an OLED panel 302 does not require backlights, the exciters 304 attached to the back of the OLED panel 302 do not influence the general function of the panel (i.e. they do not influence the presentation of video content on the OLED panel). When presenting video content on the OLED panel 302, the corresponding audio track may be easily synchronized (in time and/or space, where the sound should be emitted in order to match the video content) with the video content when generating the audio track by means of vibrating the OLED panel 302.

Each of the one or more exciters 304 may be any suitable kind of exciter. For example, an exciter 304 may comprise a magnet and a coil (not specifically illustrated), similar to conventional speakers. The OLED panel 302 has a similar function as a diaphragm in a conventional speaker. Generally, in a display loudspeaker 300, flexural resonance is encouraged such that the OLED panel 302 vibrates as randomly as possible. According to one example, each display loudspeaker 300 may comprise two exciter 304 coupled to the respective OLED panel 302 at different positions. Generally, however, a single exciter 304 may suffice, due to the comparably small size of (OLED) panels 302 used in vehicles. It is also possible that each display loudspeaker 300 comprise even more than two exciter 304.

Generally, any surface may be vibrated in order to generate sound waves. (OLED) displays are generally mounted directly in front of a passenger of a vehicle in order to present video content to the user. When vibrating the respective OLED panel 302 to generate sound waves (present audio content to the user), the sound will be perceived by the user as coming directly from the front. The sound provided to the user therefore is provided from the same direction as the video itself (positions of image and sound match). This gives the user a very intense experience and maximizes the effect of information transfer. The direction of sound emitted by a display loudspeaker 300 is schematically illustrated by means of the arrows in FIG. 1.

In the example illustrated in FIG. 1, the audio system comprises four display loudspeakers 300, wherein one display loudspeaker 300 is arranged in front of a driver seat 20 of the vehicle 10, one display loudspeaker 300 is arranged in front of a front passenger seat 22 of the vehicle 10, one display loudspeaker 300 is arranged at the back of the driver seat 20 and in front of a first rear passenger seat 24, and one display loudspeaker 300 is arranged at the back of the front passenger seat 22 and in front of a second rear passenger seat 24. This, however, is only an example. The audio system may comprise less than four display loudspeakers 300 (e.g., only for the driver, only for the front passenger, only for one or more of the rear passengers or any combination thereof), or even more than four display loudspeakers 300.

Figure 4:
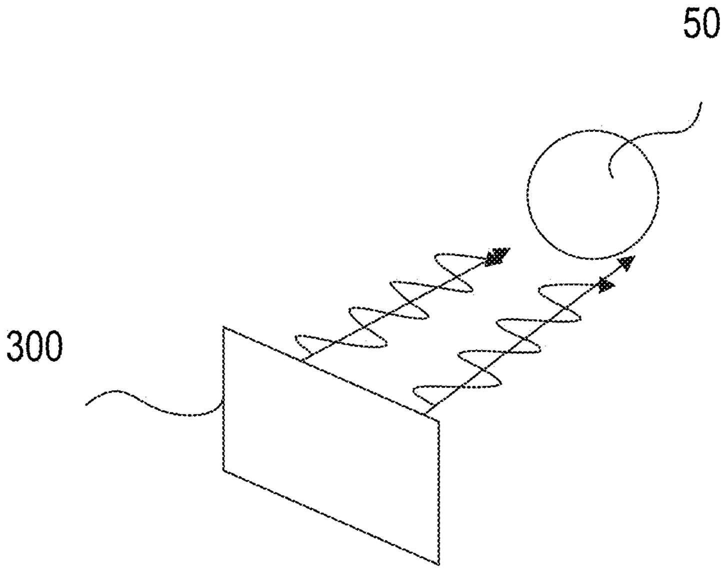
FIG. 4 schematically illustrates flat sound waves emitted by a display loudspeaker.
Figure 5:
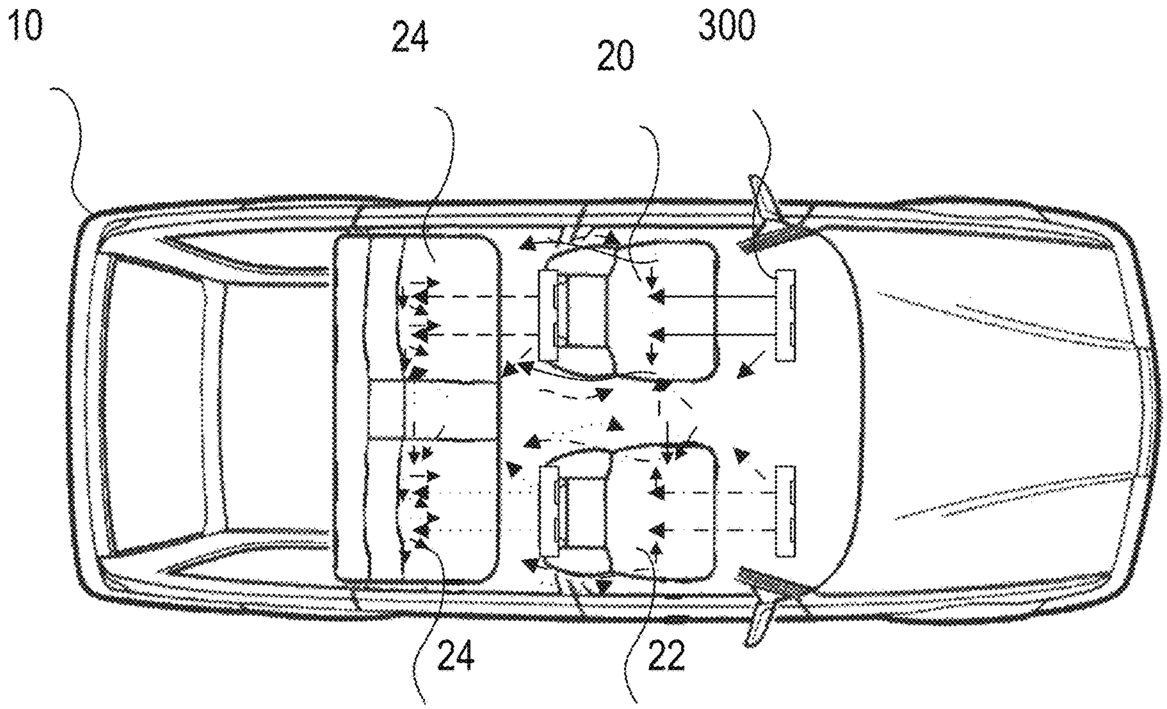
FIG. 5 schematically illustrates the influence of sound emitted by display loudspeakers on different passengers of a vehicle.

The sound waves emitted by a display loudspeaker 300 are generally flat sound waves. This is schematically illustrated by means of FIG. 4, wherein FIG. 4 illustrates a user 50 seated in front of a display loudspeaker 300 and the flat sound waves emitted by the display loudspeaker 300. When the sound waves are received from the direction of the display, the sound is perceived by the user 50 as more natural. Further, planar sound waves have a high directivity as compared to spheric acoustic waves emitted by conventional electrodynamic loudspeakers. This allows to easily generate different listening zones in a vehicle 10. As can be seen in FIG. 5, for example, the sound output by a display loudspeaker 300 is mainly only perceived by the user seated directly in front of the respective display loudspeaker 300. Other passengers within the vehicle 10 do not receive direct sound from the respective display loudspeaker 300. For example, only the driver of the vehicle 10 will receive direct sound that is output by the display loudspeaker 300 arranged directly in front of the driver's seat 20. All other passengers (e.g., front passenger or rear passengers) will only receive indirect sound from the display loudspeaker 300 arranged in front of the driver's seat 20, caused by reflections. This is schematically illustrated by means of solid lines in FIG. 5. Similarly, direct sound as well as sound caused by reflections within the vehicle 10 is indicated in dot-dashed lines for a display loudspeaker 300 arranged in front of the front passenger seat 22, in dashed lines for a display loudspeaker 300 arranged in front of a first rear passenger seat 24, and in dotted lines for a display loudspeaker 300 arranged in front of a second rear passenger seat 24. As can be seen, cross-influences between the different display loudspeakers 300 and the different passengers of the vehicle 10 are significantly less as compared to the conventional audio system of FIG. 2. Any reflections received from neighboring display loudspeakers 300 can be significantly compensated using suitable sound absorbing materials in the vehicle cabin, for example.

Display loudspeakers 300 may be used in an audio system in a listening environment in a vehicle 10 instead of or in addition to conventional speakers. That is, the audio system, in addition to the at least one display loudspeaker 300, may comprise one or more (conventional) loudspeakers such as, e.g., one or more front passenger speakers, one or more rear passenger speakers, one or more subwoofers, and/or one or more tweeters.

The audio systems as disclosed herein may provide a satisfying listening experience for every passenger of a vehicle, while at the same time requiring only little mounting space. Further, less wires will be required in order to couple the one or more display loudspeakers 300 to the at least one multimedia unit 306 as compared to audio systems only comprising conventional electrodynamic loudspeakers. The audio system, therefore, may be implemented in a smaller and considerably lighter and cheaper way as conventional audio systems for vehicles. Personalized content may be provided for every passenger of a vehicle in a very simple, cost-effective and space saving way. No or at least less loudspeakers will have to be mounted in the side panels (doors) of the vehicle. The respective mounting space in the vehicle doors, therefore, is available for other systems or elements, or the vehicle doors can be designed by car manufacturers in more efficient ways according to various criteria, e.g., less weight, less air-resistance (resulting in, e.g., a lower fuel and/or energy consumption of the vehicle), higher convenience for users of the vehicle, etc.

Further, the direction of the display loudspeakers 300, and therefore the direction from which the sound waves are perceived by a user corresponds not only to the direction of video content provided on the OLED panel 302, but also to the direction of the most critical and disturbing engine sounds. The planar waves emitted by the display loudspeakers 300 and their directivity therefore can be advantageously used in engine order cancellation systems. For this reason, the sweet-spot (e.g., space where the engine order compensation effect takes place) is much bigger as compared to conventional systems. The effects of the engine order cancellation, therefore, are much more noticeable for the occupants of the vehicle 10. Even further, the engine order compensation effect can be personalized for each individual passenger because of the directivity of the planar waves. Algorithms for active compensation of regular components of engine noise by emitting anti-waves (Engine Order Compensation, EOC, systems) are generally known.

Figure 6:
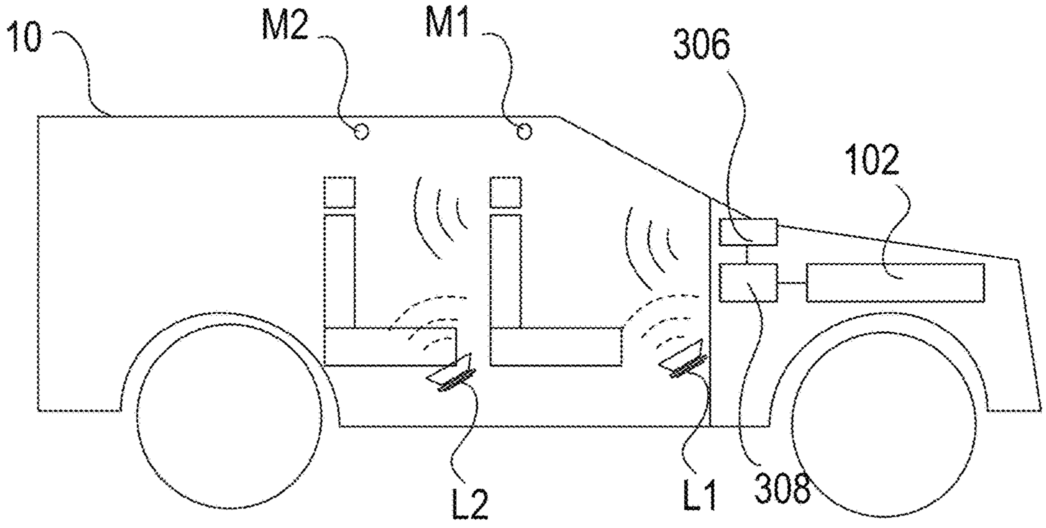
FIG. 6 schematically illustrates an example of a classical engine order cancellation system.

One example of an EOC system is schematically illustrated in FIG. 6. Engine sound, illustrated in solid lines in FIG. 6, passes through the vehicle cabin. As the engine 102 is typically located in a frontal part of the vehicle 10, the engine sound reaches each passenger from the front. A control unit 308 may generate regular anti-noise components indicated in dashed lines in FIG. 6, using microphone signals perceived by microphones M1, M2 as reference. One or more reference microphones M1, M2 may be arranged in a roof liner of the vehicle 10, for example. Anti-noise components are harmonic signals having a phase opposite to the phase of the engine harmonic orders. Anti-noise components are often emitted by speakers L1, L2 arranged in the vehicle doors. In order to make the cancellation of noise more efficient over a wide area, the speakers L1, L2 emitting the anti-noise may be arranged in the direct way of the engine noise. In other words, the signal which cancels the engine noise is output in essentially the same direction as the engine noise itself (noise to be cancelled). The more this general rule is deviated (the larger the deviation between directions of engine noise and cancellation sound), the smaller the spatial cancellation area (the sweet spot). The size of this cancellation area also depends on the frequency of the harmonic (i.e. the higher the frequency, the smaller the compensation area or sweet spot). However, the direction from which the cancellation signal is emitted plays an essential role for the efficiency of engine noise cancellation. The display loudspeakers 300 as described herein are arranged in front of the passenger's faces and, therefore, directly in the way of the engine noise coming from the front of the vehicle 10. That is, the directions almost exactly match, resulting in a large compensation area. Further, as the sound waves emitted by the display loudspeakers 300 are planar waves, they are directed directly towards the respective passengers, which further decreases the influence of the emitted compensation signals for neighboring passengers. This makes the problem of cross-talk cancellation superfluous and efficiency of engine noise compensation is improved further.

Summarizing the above, an audio system according to embodiments of the disclosure may further comprise one or more reference microphones M1, M2 arranged in a cabin of the vehicle 10, one or more loudspeakers L1, L2 arranged in the cabin of the vehicle 10, and a control unit 308. The control unit 308 receives reference signals from the one or more references microphones M1, M2, the reference signals being indicative of engine sound present in the vehicle cabin. The control unit 308, based on the reference signals, generates anti-noise components having a phase opposite to the phase of the engine sound, and the anti-noise components are output by the one or more display loudspeakers 300. That is, the display loudspeakers 300 may also replace the loudspeakers used in conventional engine order compensation systems. It shall be noted that engine order cancellation algorithms are often implemented by means of a car multimedia system.

The general concept has been described with respect to a listening environment in a passenger car above. Generally, however, the vehicle 10 may be any kind of vehicle such as, e.g., a passenger car, a van, a camper van, a caravan, a truck, a bus, a tractor, an airplane, a ship, etc. It may be understood, that the illustrated systems are merely examples. While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should be understood as not excluding plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

The invention claimed is:

1. An audio system arranged in a listening environment in a vehicle comprises at least one multimedia unit configured to output an audio signal, one or more reference microphones arranged in a cabin of the vehicle, at least one display loudspeaker, wherein each of the at least one display loudspeaker is coupled to the at least one multimedia unit and receives the audio signal from the at least one multimedia unit, each of the at least one display loudspeaker comprises an OLED panel and at least one exciter coupled to the OLED panel and configured to vibrate the OLED panel to reproduce the audio signal, and each of the at least one display loudspeakers is arranged in front of a respective passenger of the vehicle such that the sound emitted from the display loudspeaker is directed toward the respective passenger from a same direction as engine noise entering the cabin of the vehicle from a front of the vehicle, and a control unit configured to receive reference signals from the one or more reference microphones, the reference signals being indicative of engine sound present in the vehicle cabin, wherein the control unit, based on the reference signals, generates anti-noise components having a phase opposite to a phase of the engine sound, and the anti-noise components are output by the at least one display loudspeaker.

2. The audio system of claim 1, wherein at least one of:

one display loudspeaker is arranged in front of a driver seat of the vehicle, one display loudspeaker is arranged in front of a front passenger seat of the vehicle, one display loudspeaker is arranged at the back of the driver seat and in front of a first rear passenger seat, and one display loudspeaker is arranged at the back of the front passenger seat and in front of a second rear passenger seat.

3. The audio system of claim 1, wherein each of the at least one display loudspeaker comprises two exciter coupled to the respective OLED panel.

4. The audio system of claim 1, wherein the at least one multimedia unit is further configured to output a video signal, and each of the at least one display loudspeaker is configured to output the video signal on the OLED panel.

5. The audio system of claim 4, wherein the audio signal represents an audio track corresponding to the video signal.

6. The audio system of claim 1, further comprising at least one additional loudspeaker coupled to the at least one multimedia unit.

7. The audio system of claim 6, wherein the at least one additional loudspeaker comprises at least one of:

one or more front passenger speakers, one or more rear passenger speakers, one or more subwoofers, and one or more tweeters.

8. The audio system of claim 1, wherein the sound emitted by each of the at least one display loudspeaker comprises planar sound waves directed toward the respective passenger seated in front of the display loudspeaker, such that the anti-noise components output by each display loudspeaker are directed toward the respective passenger and are not received as direct sound by other passengers in the vehicle cabin.

9. The audio system of claim 1, wherein the vehicle is a passenger car, a van, a camper van, a caravan, a truck, a bus, a tractor, an airplane, or a ship.

* * * * *